US008752542B2

(12) United States Patent
O'Donnell et al.

(10) Patent No.: US 8,752,542 B2
(45) Date of Patent: Jun. 17, 2014

(54) DIRECT SOLAR STEAM GENERATION

(75) Inventors: John Setel O'Donnell, Palo Alto, CA (US); Peter Emery von Behrens, San Francisco, CA (US); Stuart M. Heisler, Bakersfield, CA (US)

(73) Assignee: Glasspoint Solar, Inc., Fremont, CA (US)

( * ) Notice: Subject to any disclaimer, the term of this patent is extended or adjusted under 35 U.S.C. 154(b) by 0 days.

(21) Appl. No.: 13/576,652

(22) PCT Filed: Jul. 3, 2011

(86) PCT No.: PCT/US2011/042906
§ 371 (c)(1),
(2), (4) Date: Aug. 1, 2012

(87) PCT Pub. No.: WO2012/006257
PCT Pub. Date: Jan. 12, 2012

(65) Prior Publication Data
US 2013/0092153 A1    Apr. 18, 2013

Related U.S. Application Data

(60) Provisional application No. 61/361,512, filed on Jul. 5, 2010, provisional application No. 61/445,545, filed on Feb. 23, 2011.

(51) Int. Cl.
| F24J 2/38 | (2014.01) |
| F24J 2/24 | (2006.01) |
| F24J 2/50 | (2006.01) |
| F24J 2/12 | (2006.01) |
| F28G 1/12 | (2006.01) |
| B08B 9/00 | (2006.01) |

(52) U.S. Cl.
USPC ........... 126/600; 126/651; 126/652; 126/655; 126/692; 126/694; 165/95; 15/3.5

(58) Field of Classification Search
USPC ................. 126/600, 651, 652, 655, 692, 694; 165/95; 15/3.5
See application file for complete search history.

(56) References Cited

U.S. PATENT DOCUMENTS

| 1,240,890 A | 9/1917 | Shuman et al. |
| 2,217,593 A | 10/1940 | London |

(Continued)

FOREIGN PATENT DOCUMENTS

| CN | 2926930 Y | 7/2007 |
| CN | 201359397 Y | 12/2009 |

(Continued)

OTHER PUBLICATIONS

Ham, Joung Hyun, PCT/US2011/042906 PCT International Search Report, Mar. 9, 2012, entire document (4 pages), Korean Intellectual Property Office, Seo-gu, Republic of Korea.

(Continued)

*Primary Examiner* — Kenneth Rinehart
*Assistant Examiner* — William Corboy
(74) *Attorney, Agent, or Firm* — Perkins Coie LLP

(57) ABSTRACT

Solar energy generates steam in a "once-through" configuration without recirculation, with closely managed steam quality, to produce wet steam from high-contaminant feed water without scaling or fouling. Feed water is pressurized, preheated, and evaporated in a series of pipes exposed to concentrated solar energy to produce a water-steam mixture for direct distribution to an industrial process such as enhanced oil recovery or desalination. Water flow rates are managed based on measurements of solar energy and steam production to manage variations in the solar energy. Steam generator piping system uses continuous receiver pipe that is illuminated by segmented parabolic mirrors enabled to track the sun. Provisions for steam generator piping recurring maintenance are provided. Thermal energy from hot condensate and/or from low quality steam is recaptured and warms inlet water.

7 Claims, 6 Drawing Sheets

(56) References Cited

U.S. PATENT DOCUMENTS

| | | | |
|---|---|---|---|
| 2,221,919 A | | 11/1940 | Kennan |
| 3,672,572 A | | 6/1972 | Delfs |
| 3,847,136 A | * | 11/1974 | Salvail ............................ 126/592 |
| 3,923,039 A | | 12/1975 | Falbel |
| 3,962,873 A | | 6/1976 | Davis |
| 3,991,740 A | | 11/1976 | Rabl |
| 3,994,279 A | * | 11/1976 | Barak ............................ 126/591 |
| 4,015,585 A | | 4/1977 | Fattor |
| 4,078,549 A | | 3/1978 | McKeen et al. |
| 4,083,155 A | | 4/1978 | Lampert |
| 4,095,369 A | | 6/1978 | Posnansky et al. |
| 4,122,832 A | | 10/1978 | Hirschsohn et al. |
| 4,124,277 A | | 11/1978 | Stang |
| 4,149,523 A | | 4/1979 | Boy-Marcotte et al. |
| 4,174,752 A | | 11/1979 | Slater et al. |
| 4,184,482 A | | 1/1980 | Cohen |
| 4,202,322 A | | 5/1980 | Delgado et al. |
| 4,219,008 A | | 8/1980 | Schultz |
| 4,237,864 A | | 12/1980 | Kravitz |
| 4,249,340 A | | 2/1981 | Maes, Jr. |
| 4,263,893 A | | 4/1981 | Pavlak et al. |
| 4,280,480 A | | 7/1981 | Raposo |
| 4,282,394 A | | 8/1981 | Lackey et al. |
| 4,287,880 A | | 9/1981 | Geppert |
| 4,290,419 A | | 9/1981 | Rabedeaux |
| 4,314,604 A | * | 2/1982 | Koller ............................ 165/95 |
| 4,318,394 A | | 3/1982 | Alexander |
| 4,333,447 A | | 6/1982 | Lemrow et al. |
| 4,343,533 A | | 8/1982 | Currin et al. |
| 4,372,386 A | | 2/1983 | Rhoades et al. |
| 4,386,600 A | | 6/1983 | Eggert, Jr. |
| 4,410,156 A | | 10/1983 | Pischzik |
| 4,423,719 A | | 1/1984 | Hutchison |
| 4,462,390 A | | 7/1984 | Holdridge et al. |
| 4,484,568 A | | 11/1984 | Witt |
| 4,628,142 A | | 12/1986 | Hashizume |
| 4,727,854 A | | 3/1988 | Johnson |
| 4,741,161 A | | 5/1988 | Belart et al. |
| 5,103,524 A | * | 4/1992 | Vowles ............................ 15/3.51 |
| 5,191,876 A | | 3/1993 | Atchley |
| 5,258,101 A | | 11/1993 | Breu |
| 5,347,402 A | | 9/1994 | Arbogast |
| 5,520,747 A | | 5/1996 | Marks |
| 5,524,610 A | | 6/1996 | Clark |
| 5,851,309 A | | 12/1998 | Kousa |
| 6,017,002 A | | 1/2000 | Burke et al. |
| 6,129,844 A | | 10/2000 | Dobelmann |
| 6,233,914 B1 | | 5/2001 | Fisher |
| 6,363,928 B1 | | 4/2002 | Anderson, Jr. |
| 6,485,152 B2 | | 11/2002 | Wood |
| 6,508,850 B1 | | 1/2003 | Kotliar |
| 7,055,519 B2 | | 6/2006 | Litwin |
| 7,748,137 B2 | | 7/2010 | Wang |
| 7,858,875 B2 | | 12/2010 | Lu |
| 7,992,553 B2 | | 8/2011 | Le Lievre |
| 8,333,186 B2 | | 12/2012 | Jennings |
| 8,397,434 B2 | | 3/2013 | Bayne |
| 2001/0008144 A1 | | 7/2001 | Uematsu et al. |
| 2003/0188477 A1 | | 10/2003 | Pasternak |
| 2004/0004303 A1 | | 1/2004 | Iskra |
| 2004/0055594 A1 | | 3/2004 | Hochberg et al. |
| 2006/0048770 A1 | | 3/2006 | Meksvanh et al. |
| 2007/0056726 A1 | | 3/2007 | Shurtleff |
| 2008/0066736 A1 | | 3/2008 | Zhu |
| 2008/0083405 A1 | | 4/2008 | Kimura et al. |
| 2008/0163864 A1 | | 7/2008 | Larson |
| 2008/0216822 A1 | | 9/2008 | Lazzara et al. |
| 2008/0236227 A1 | | 10/2008 | Flynn |
| 2008/0308094 A1 | | 12/2008 | Johnston |
| 2009/0056698 A1 | | 3/2009 | Johnson et al. |
| 2009/0056699 A1 | | 3/2009 | Mills et al. |
| 2009/0056704 A1 | | 3/2009 | Donati et al. |
| 2009/0260359 A1 | | 10/2009 | Palkes |
| 2010/0000733 A1 | | 1/2010 | Chiesa et al. |
| 2010/0051016 A1 | | 3/2010 | Ammar |
| 2010/0300431 A1 | | 12/2010 | Carrascosa Perez et al. |
| 2011/0088686 A1 | | 4/2011 | Hochberg et al. |
| 2011/0126824 A1 | | 6/2011 | Conlon et al. |
| 2011/0174935 A1 | | 7/2011 | Bingham et al. |
| 2011/0203574 A1 | | 8/2011 | Harding |
| 2011/0240006 A1 | | 10/2011 | Linke et al. |
| 2011/0277470 A1 | * | 11/2011 | Benyaminy et al. ......... 60/641.8 |
| 2011/0291405 A1 | | 12/2011 | Burger et al. |
| 2012/0067337 A1 | | 3/2012 | Hall et al. |
| 2012/0167873 A1 | | 7/2012 | Venetos et al. |
| 2012/0234311 A1 | | 9/2012 | Johnson et al. |
| 2012/0255309 A1 | | 10/2012 | Venetos et al. |

FOREIGN PATENT DOCUMENTS

| | | | |
|---|---|---|---|
| EP | 988493 B1 | 3/2000 | |
| EP | 0946432 B1 | 1/2001 | |
| JP | 56085508 | 7/1981 | |
| JP | 2001082104 | 3/2001 | |
| KR | 10-2008-0024309 | 3/2008 | |
| WO | WO-2008153922 A1 | 12/2008 | |
| WO | WO 2009126875 A2 * | 10/2009 | ............... B05D 7/22 |
| WO | WO-2010088632 A2 | 8/2010 | |
| WO | WO-2011053863 A2 | 5/2011 | |

OTHER PUBLICATIONS

Ham, Joung Hyun, PCT/US2011/042906 PCT Written Opinion, Mar. 9, 2012, entire document (6 pages), Korean Intellectual Property Office, Seo-gu, Republic of Korea.

U.S. Appl. No. 13/902,492, filed May 24, 2013, O'Donnell et al.

BrightSource Limitless, "Coalinga Project Facts, A BrightSource Energy Concentrating Solar Power Project," Fact Sheet, accessed Sep. 19, 2013, http://www.brightsourceenergy.com/stuff/contentmgr/files/0/ad5d33a2bc493a5079b5dda609724238/folder/coalinga_fact_sheet.pdf, 2 pages.

BrightSource Limitless, "Enhanced Oil Recovery Project—Coalinga," accessed Sep. 19, 2013, http://www.brightsourceenergy.com/coalinga, 2 pages.

Ha, Jeong Kyun, PCT/US2011/042907 PCT International Search Report, Feb. 24, 2012, entire document, Korean Intellectual Property Office, Seo-gu, Republic of Korea.

International Preliminary Report on Patentability and Written Opinion of International Application No. PCT/US2011/042698 mailed Jan. 17, 2013, 6 pages.

International Preliminary Report on Patentability and Written Opinion issued in PCT/US2011/042891 and mailed Mar. 12, 2012, 14 pages.

International Search Report and Written Opinion issued in PCT/US2012/025832, mailed Oct. 23, 2012, 9 pages.

International Search Report issued in PCT/US2011/042968 completed on Mar. 9, 2012 (3 pages).

Lim, Hyung Gun, PCT/US2010/022780 PCT International Search Report, Oct. 13, 2010, entire document, Korean Intellectual Property Office, Seo-gu, Republic of Korea.

Lim, Hyung Gun, PCT/US2010/022780 PCT Written Opinion, Oct. 13, 2010, entire document, Korean Intellectual Property Office, Seo-gu, Republic of Korea.

Linder, Nora, PCT/US2010/022780 PCT International Preliminary Report on Patentability, Aug. 2, 2011, entire document, International Bureau of WIPO, Geneva, Switzerland.

Search Report issued for Chinese Patent Application No. 201080006211.6 issued Feb. 17, 2013.

Wilson, Bob. "Re: Why does a bridge have rollers under it? How do the rollers of a bridge work?", Newton Ask A Scientist! (DOE Office of Science) [online], Jan. 2, 2008 [retrieved from the internet <URL:http://web.archive.org/web/20080102111713/http://www.newton.dep.anl.gov/askasci/eng99/eng99556.htm>.

The Linde Group, "Enhanced Oil Recovery (EOR)", 1 page, accessed Oct. 7, 2013.

(56) References Cited

OTHER PUBLICATIONS

Champion Technologies, "Enhanced Oil Recovery." 2 pages, accessed Oct. 7, 2013.
Adventures in Energy, "Extracting Oil and Natural Gas." 1 pages, accessed Oct. 7, 2013.
Adventures in Energy, "Separating Oil, Natural Gas and Water." 1 page, accessed Oct. 7, 2013.
Proz, 'on the edge of manufacturing tolerance' [bulletin board], Mar. 12, 2005 [retrieved on Jan. 7, 2014]. Retrieved from the internet <http://www.proz.com/kudoz/English/military_defense/968330-on_the_edge_of_manufacturing_tolerance.html>.

* cited by examiner

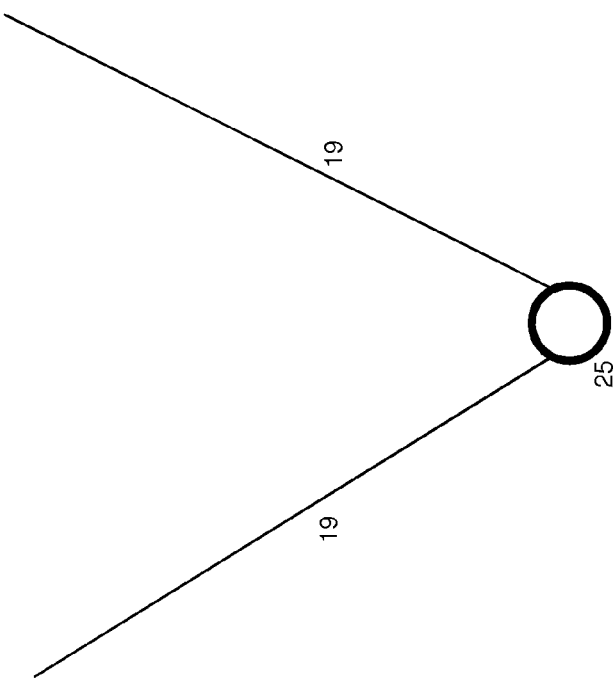

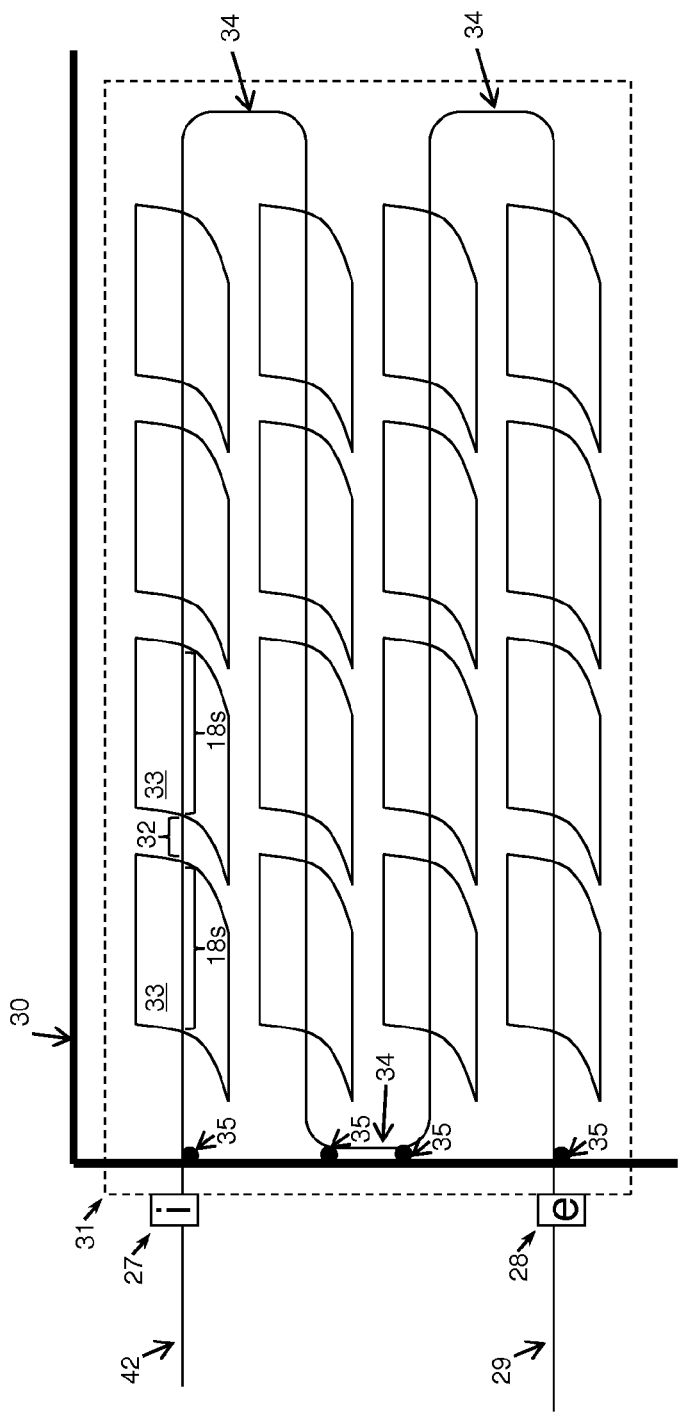

DIRECT SOLAR STEAM GENERATION

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

U.S. Provisional Application Ser. No. 61/149,292, filed Feb. 2, 2009, first named inventor Rod MacGregor, and entitled Concentrating Solar Power with Glasshouses;

U.S. Provisional Application Ser. No. 61/176,041, filed May 6, 2009, first named inventor Peter Von Behrens, and entitled Concentrating PhotoVoltaics with Glasshouses;

PCT Application Serial No. PCT/US10/22780, filed Feb. 1, 2010, first named inventor Roderick MacGregor, and entitled Concentrating Solar Power with Glasshouses;

U.S. Provisional Application Ser. No. 61/361,509, filed Jul. 5, 2010, first named inventor Peter Von Behrens, and entitled Concentrating Solar Power with Glasshouses;

U.S. Provisional Application Ser. No. 61/361,512, filed Jul. 5, 2010, first named inventor John Setel O'Donnell, and entitled Direct Solar Oilfield Steam Generation;

U.S. Provisional Application Ser. No. 61/445,545, filed Feb. 23, 2011, first named inventor John Setel O'Donnell, and entitled Direct Solar Oilfield Steam Generation, and PCT Application Serial No. PCT/US11/42891, filed Jul. 2, 2011, first named inventor Peter Von Behrens, and entitled Concentrating Solar Power with Glasshouses.

BACKGROUND

1. Field

Advancements in solar energy collection and use thereof are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Concentrated solar power systems use minors, known as concentrators, to gather solar energy over a large space and aim and focus the energy at receivers that convert incoming solar energy to another form, such as heat or electricity. There are several advantages, in some usage scenarios, to concentrated systems over simpler systems that directly use incident solar energy. One advantage is that more concentrated solar energy is more efficiently transformed to heat or electricity than less concentrated solar energy. Thermal and photovoltaic solar receivers operate more efficiently at higher incident solar energy levels. Another advantage is that non-concentrated solar energy receivers are, in some usage scenarios, more expensive than minor systems used to concentrate sunlight. Thus, by building a system with mirrors, total cost of gathering sunlight over a given area and converting the gathered sunlight to useful energy is reduced.

Concentrated solar energy collection systems, in some contexts, are divided into four types based on whether the solar energy is concentrated into a line-focus receiver or a point-focus receiver and whether the concentrators are single monolithic reflectors or multiple reflectors arranged as a Fresnel reflector to approximate a monolithic reflector.

A line-focus receiver is a receiver with a target that is a relatively long straight line, like a pipe. A line-focus concentrator is a reflector that receives sunlight over a two dimensional space and concentrates the sunlight into a significantly smaller focal point in one dimension (width) while reflecting the sunlight without concentration in the other dimension (length) thus creating a focal line. A line-focus concentrator with a line-focus receiver at its focal line is a basic trough system. The concentrator is optionally rotated in one dimension around its focal line to track daily movement of the sun to improve total energy capture and conversion.

A point-focus receiver is a receiver target that is essentially a point, but in various approaches is a panel, window, spot, ball, or other target shape, generally more equal in width and length than a line-focus receiver. A point-focus concentrator is a reflector (made up of a single smooth reflective surface, multiple fixed facets, or multiple movable Fresnel facets) that receives sunlight over a two-dimensional space and concentrates the sunlight into a significantly smaller focal point in two dimensions (width and length). A monolithic point-focus concentrator with a point-focus receiver at its focal point is a basic dish concentrated solar system. The monolithic concentrator is optionally rotated in two dimensions to rotate its focal axis around its focal point to track daily and seasonal movement of the sun to improve total energy capture and conversion.

A parabolic trough system is a line concentrating system using a monolithic reflector shaped like a large half pipe. The reflector has a 1-dimensional curvature to focus sunlight onto a line-focus receiver or approximates such curvature through multiple facets fixed relative to each other.

A concentrating Fresnel reflector is a line concentrating system similar to the parabolic trough replacing the trough with a series of mirrors, each the length of a receiver, that are flat or alternatively slightly curved in their width. Each mirror is individually rotated about its long axis to aim incident sunlight onto the line-focus receiver.

A parabolic dish system is a point concentrating system using a monolithic reflector shaped like a bowl. The reflector has a 2-dimensional curvature to focus sunlight onto a point-focus receiver or approximates such curvature through multiple flat or alternatively curved facets fixed relative to each other.

A solar power tower is a point concentrating system similar to the parabolic dish, replacing the dish with a 2-dimensional array of mirrors that are flat or alternatively curved. Each mirror (heliostat) is individually rotated in two dimensions to aim incident sunlight onto a point-focus receiver. The individual mirrors and an associated control system form a point-focus concentrator whose focal axis rotates around its focal point.

In solar thermal systems, the receiver is a light to heat transducer. The receiver absorbs solar energy, transforming it to heat and transmitting the heat to a thermal transport medium such as water, steam, oil, or molten salt. The receiver converts solar energy to heat and minimizes and/or reduces heat loss due to thermal radiation.

SYNOPSIS

The invention may be implemented in numerous ways, including as a process, an article of manufacture, an apparatus, a system, and a composition of matter. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

BRIEF DESCRIPTION OF DRAWINGS

FIG. 4 illustrates, in section view, various details of an embodiment of a steam generator piping suspension mechanism.

FIG. 5a illustrates, in plan view, various details of an embodiment of a water preheat portion of solar direct steam generator piping.

DETAILED DESCRIPTION

Figure 1:
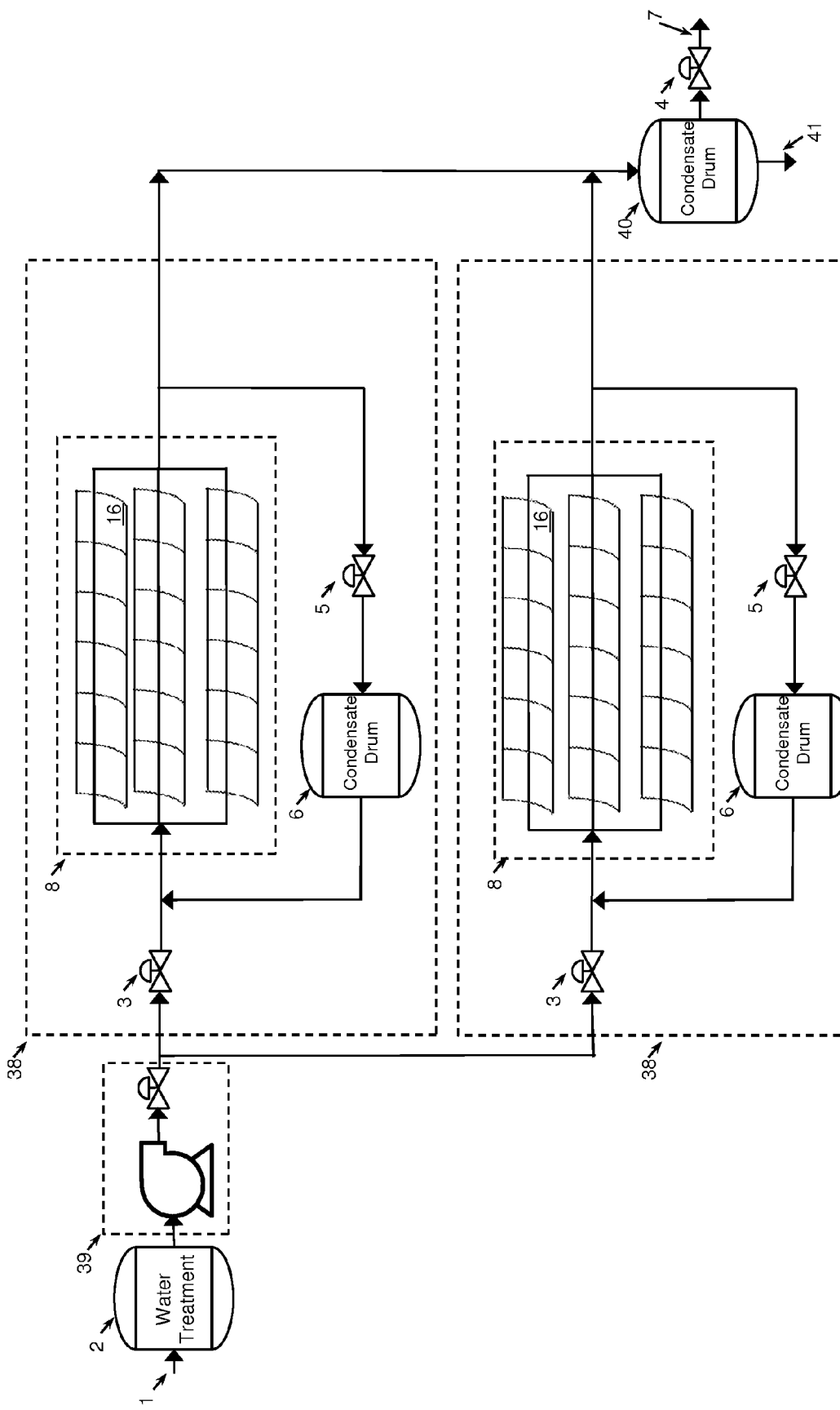
FIG. 1 illustrates various details of an embodiment of direct solar field steam generation.

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

The terms "tube" and "pipe" (and variants thereof) are used interchangeably herein, unless specifically noted otherwise. An example of a tube and/or pipe is a hollow cylinder used to conduct and/or convey a liquid, gas, and/or finely divided solid. In various embodiments and/or usage scenarios, tubing/piping is specified with respect to material type, diameter (e.g. inside or outside), thermal characteristics, corrosion resistance, and other criteria and/or parameters.

Thermal techniques for enhanced oil recovery are used for current oil production around the world. For example, steam injection provides nearly half of California's oil production, and ongoing expansion of steam flood and steam stimulation systems is useful for a stable energy supply.

In some approaches, steam used in oilfield operations is injected at temperatures ranging from 300 F to 700 F or 750 F, and pressures at up to 1500 or 2500 PSI, where the temperatures and pressures are determined by specifics of oil formation and production techniques. In some approaches, steam generators, or "boilers", producing high-pressure, high-temperature steam, use high water purity to avoid corrosion, scale formation, and other deterioration of heat-transfer surfaces.

Steam generator techniques for enhanced oil recovery are enabled, in various embodiments and/or usage scenarios, to improve performance in various areas. Large quantities of water are routed in a "once-through" configuration, where feed water is pressurized, preheated, and evaporated in a series of pipes exposed to heat, and an outlet stream (a steam-water mixture) is directly distributed to an oilfield. In some cases, the steam-water mixture is directly injected into wells; in other cases, separators divide further flow of water and steam. Unlike a steam power plant, for example, purified water is not recycled; instead water is continuously treated, heated, and injected as steam. Due to a high volume of water needing treatment, in some scenarios, oilfield operations provide feed water to some steam generators that would not meet purity standards for high-pressure, high-temperature steam generation in other steam generators or boilers. In some usage scenarios, oilfield steam generator feed water contains silica and other residual dissolved solids that place various constraints on design and operation of the steam generator. For example, American Petroleum Institute Recommended Practices document 11T specifies water chemistry characteristics commonly used in oilfield steam generators; total dissolved solids may be 7,000 to 30,000 parts per million (PPM).

In some embodiments and/or usage scenarios, solar energy is used as a source of oilfield steam. Concentrating solar energy collectors are enabled to heat fluids to temperatures enabling oilfield steam production, and suitably designed solar energy systems are enabled to reduce oil production cost and greenhouse gas emissions. In various embodiments, concentrating solar energy collectors have a control system that moves multiple solar reflectors, causing the solar reflectors to track movement of the sun and direct energy onto pipes of a receiver. The reflector control system is enabled to direct some or all reflectors to go "off-sun", directing light away from the receiver; the "off-sun" position prevents potential overheating and damage to the receiver when there are deviations from usual operating conditions.

Solar energy collectors use free "fuel"—solar radiation—so capital cost of collector systems and net collector efficiency are, in some embodiments and/or usage scenarios, elements to consider in building practical and cost-effective solar oilfield steam generation systems.

Various embodiments and/or usage scenarios using solar radiation as an energy source are enabled to improve performance in oilfield steam generation contexts using various techniques described herein. For example, some of the techniques improve land use of solar collection. For another example, some of the techniques improve operation given that timing and amount of incoming solar radiation (sunshine) are not controllable. Various embodiments and/or usage scenarios described herein enable reducing cost of oilfield steam generation.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A method comprising:
transforming a section of pipe by shaping, coating, and mounting in place to form a plurality of continuous solar energy receiver pipes.

EC2) The method of EC1, wherein the section of pipe is a single section of pipe.

EC3) The method of EC1, further comprising operating at least a portion of the continuous solar energy receiver pipes in parallel and balancing liquid flow across the continuous solar energy receiver pipes that are operated in parallel.

EC4) The method of EC1, wherein each of the continuous solar energy receiver pipes are enabled to carry water from a respective inlet end of the respective continuous solar energy receiver pipe to a respective outlet end of the respective continuous solar energy receiver pipe.

EC5) The method of EC1, wherein each continuous solar energy receiver pipe is enabled to be illuminated by a plurality of independently movable parabolic reflectors.

EC6) The method of EC1, wherein each parabolic reflector is suspended from the continuous solar energy receiver pipe.

EC7) A method comprising:
forming each of a plurality of continuous solar energy receiver pipes by welding end-to-end multiple sections of coated pipe.

EC8) The method of EC6, further comprising operating at least a portion of the continuous solar energy receiver pipes in parallel and balancing liquid flow across the continuous solar energy receiver pipes that are operated in parallel.

EC9) The method of EC6, wherein each of the continuous solar energy receiver pipes are enabled to carry water from a respective inlet end of the respective continuous solar energy receiver pipe to a respective outlet end of the respective continuous solar energy receiver pipe.

EC10) The method of EC6, wherein each continuous solar energy receiver pipe is enabled to be illuminated by a plurality of independently movable parabolic reflectors.

EC11) The method of EC6, wherein each parabolic reflector is suspended from the continuous solar energy receiver pipe.

Active Steam Quality Management

In various embodiments and/or usage scenarios, active steam quality management enables improved oilfield steam generation and/or use. One element of a once-through oilfield steam generator is close management of outlet steam quality in every heat-exposed pipe in a system. Because liquid water is evaporated as it proceeds through the steam generator piping, residual contaminants carried in feed water concentrate as the liquid volume drops, progressively rising as the liquid converts to vapor phase. The term "steam quality" refers to a percentage of inlet water mass that has been converted to vapor phase; thus 70% steam quality has 30% of original feed water in liquid phase, and contaminants are concentrated by more than threefold from original feed water.

Conceptually, an ideal oilfield steam generator delivers a highest possible steam quality for a given feed water quality. Higher steam quality delivers more energy per pound of water injected. However, if steam quality exceeds limits imposed by water contaminant concentration, corrosion and scaling begin to occur at unacceptably high rates, causing fouling, plugging, and potential failure or burnout of steam generator piping and/or tubing. In some contexts, economical operation is enabled by tightly controlling steam quality, such as within a 5 to 10% range.

In some approaches, fuel-fired steam generators measure inlet air and water temperatures and control fuel firing rate and water feed rate to maintain steam quality within a desired range. Various "reboiler" solar steam generators use a solar receiver that heats high-purity water or other heat transfer fluid in a closed-cycle loop to gather solar energy. The gathered solar energy is delivered via a "reboiler" as steam into oilfield water. Managed-quality oilfield steam is provided by measuring incoming fluid and/or gas temperature and flow, and by modulating feed water flow via techniques similar to those used for fuel-fired oilfield steam generation.

In various embodiments and/or usage scenarios, such as FIG. 1, oilfield feed water is directly heated and evaporated in a solar receiver, without a reboiler, eliminating cost associated with the reboiler. An example of a system having the solar receiver is described following.

A control system operates to deliver managed-quality oilfield steam directly heated by solar radiation. Water inlet source 1 provides liquid water, treated to remove certain contaminants by water treatment facility 2, either pressurized or at ambient pressure. The water source is a distribution system that is shared among one or more solar steam generators 38 and zero or more fuel-fired steam generators (not illustrated). Outlet steam line 7 carries pressurized high-temperature steam of suitable temperature and quality to various points of use. In some embodiments, steam quality is maintained through a combination of three mechanisms. The first mechanism is inlet flow control system 39 (having zero or more pumps and zero or more valves) that delivers an approximately appropriate amount of inlet water to one or more solar heaters 8 as determined according to average current solar conditions. Current conditions include time of year, time of day, and/or weather conditions, as measured by a local control system. The second mechanism is precise control of water flow into a solar field and is performed by inlet trim valves 3 under control of local steam quality measurement systems (including, e.g., flow, temperature, and/or steam quality). The third mechanism is condensate drum 40 placed at an output of the solar heater that separates out excess condensate and forwards steam of appropriate quality to a destination (e.g. via outlet steam line 7). In some embodiments, heat in the liquid condensate discharge (provided, e.g., via pipe outlet 41) is recycled to preheat inlet water.

At night, the solar receiver system is cool and full of water. In morning, the system first operates in "preheat mode". In some embodiments, as the sun rises and collector mirrors 16 of the solar collectors concentrate sunlight and begin to deliver heat, a circulating pump recirculates water through various portions of the system. As the water heats, expands, and begins to boil, warm/hot water and low-quality steam are vented through return valve 5 to a "water/steam return vessel", as illustrated by condensate drum 6, where steam is recondensed via contact with water, and resulting warmed water is pumped or released back into an inlet feed water system. Recondensing the low-quality steam with contact by water results in approximately a same level of dissolved contaminants compared to original feed water, offering, in some scenarios, improved operation compared to approaches where steam is separated from recirculating liquid, resulting in an increased level of dissolved contaminants compared to original feed water. In some embodiments, recirculation in an unattended boiler is not allowed by local codes. In some embodiments, recapture of heat without recirculation of feed water is via a heat exchanger before feed water is dumped. In some embodiments, heated water is supplied to another process or user enabled to consume heated water. In some embodiments, output of a solar system is closed until the system has produced enough heat and pressure to allow production to begin.

As solar radiation increases, steam quality rises, and the system switches to "operating mode." In operating mode, steam flow from the solar collectors is directed to the outlet steam line through outflow valve 4 and flow into the return vessel is disabled by closing return valve 5. Inlet water flow rate is managed by an automatic control system, such as via modulating a rate of a pump or such as via modulating flow rate across an inlet valve. The automatic control system measures one or more parameters to determine proper inlet flow rate. The measured parameters include:

Inlet and outlet temperature, pressure, and flow rate;
Instantaneous solar radiation;
Time of day/time of year and history of solar radiation at current date/time;
Inlet and outlet liquid purity (dissolved solids), measured either indirectly through proxies such as conductivity, or directly through proxies such as light transmission or reactivity with sensing materials; and
Flow rate of liquid after a steam/water separation mechanism in a line.

In some situations, variations in solar radiation occur rapidly: such as when a cloud passes in front of the sun, or when the sun emerges from behind the cloud. The variations, in some cases, cause rapid transients in steam quality and affect overall system operation. The automatic control system manages the inlet water flow rate and inlet and outlet trim valves to reduce, minimize, or prevent some or all of the transients and/or the affects. In some embodiments, an outlet separator drum, as illustrated by condensate drum 40, enables a solar system to supply contract quality steam and recover heat from condensate through rapid transients in solar conditions.

The control system minimizes, reduces, and/or prevents drops in steam quality when solar radiation drops by downward modulation of inlet flow rate. When the modulation is insufficient to prevent outlet steam quality drop, outflow steam valve 4 is closed and a lower-quality steam-water mixture is directed to return vessel 6 until steam quality is again in-range.

When steam quality trends upwards, and/or when solar radiation monitors detect an increase in sunshine, water flow rate is adjusted via prediction upwards, using history of solar radiation at current date/time to ensure that, even in the event of full on-sun transient, steam quality is not exceeded. In some embodiments, a control system managing steam quality causes some of collector mirrors 16 to go "off-sun", reducing primary heat input to the solar collectors during solar transients to prevent steam quality being exceeded. In some embodiments, outlet steam quality is measured by separating a portion of outlet liquid from vapor components and separately measuring flow rates or masses of each component. In some embodiments, outlet steam quality is measured by separating a portion of the outlet liquid from vapor components and measuring characteristics of the liquid, including optical and electrical properties, to determine total dissolved solids as a proxy for determining concentration ratio versus the same properties in feed water, and thus determine what portion of feed water has been converted to vapor. In some embodiments, flow velocity and pressure are measured and used to calculate steam quality; measurement systems optionally use ultrasonic and/or thermal velocity sensors for one or more of the measurements.

In some embodiments and/or usage scenarios, a control system enables oilfield steam generation (and delivery of steam into an oilfield steam distribution system) that reduces, minimizes, and/or prevents delivery of low-quality steam. In some embodiments and/or usage scenarios, a control system enables outlet steam quality that is rarely or never exceeded, thus reducing, minimizing, and/or preventing pipe-damaging scale and corrosion events. In some situations, the control system responds to a solar radiation transient such that (a conceptually paradoxical) "overshoot" in feed water supply occurs, causing a momentary drop in outlet steam quality (and optional and/or selective temporary suspension of solar field steam delivery, such as by closing outlet steam valve 4). The overshoot results in little or no damage. However, an "undershoot" in response to solar radiation transients, could potentially result in permanent damage, such as by scale deposition.

Steam Generator Continuous Piping System

Figure 2:
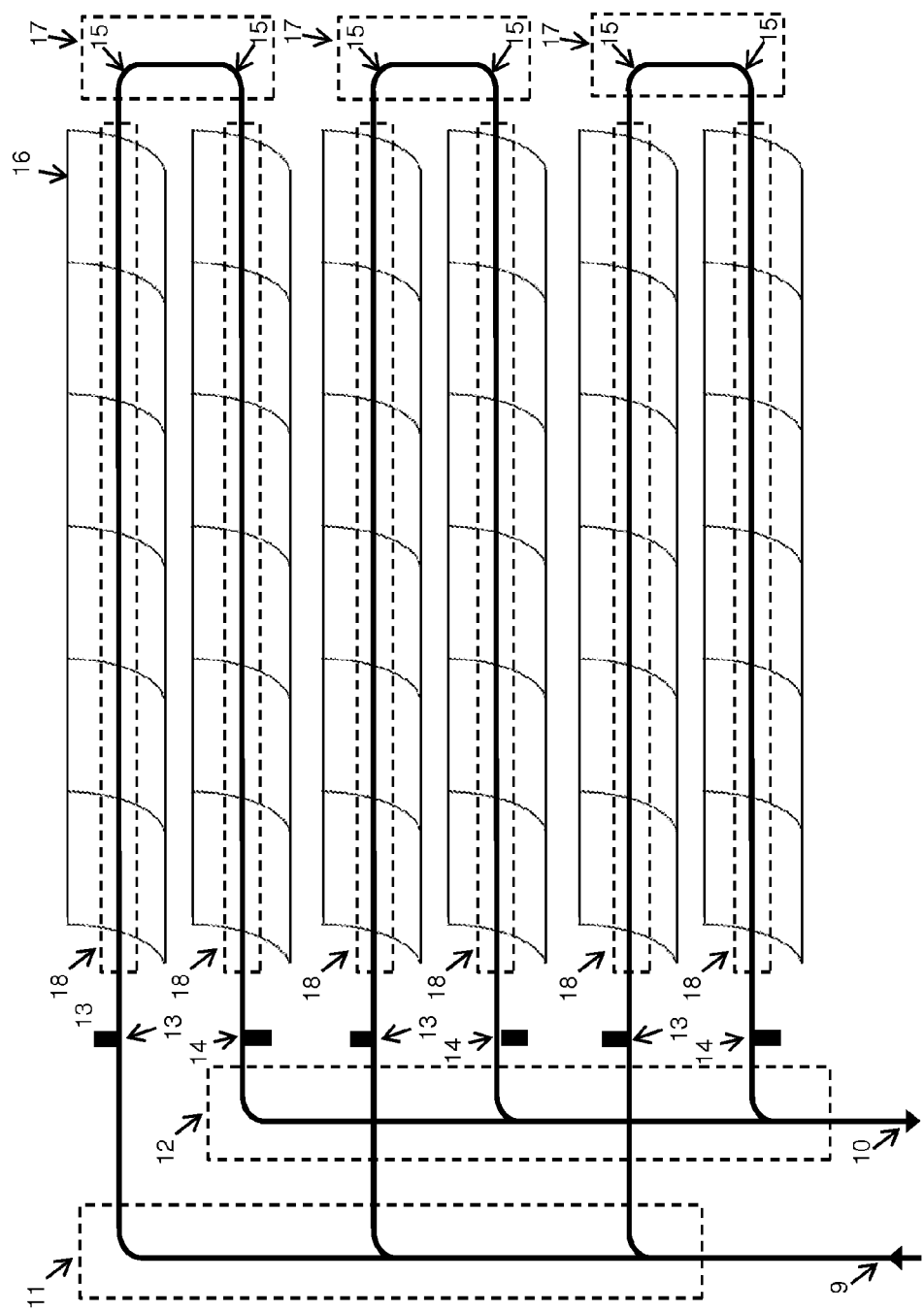
FIG. 2 illustrates various details of an embodiment of a steam generator piping system in a context of solar energy collection.

In various embodiments and/or usage scenarios, such as illustrated by FIG. 2, a steam generator continuous piping system enables improved oilfield steam generation and/or use. In various contexts, oilfield steam generation benefits from precise control of steam quality at all points along piping in a steam generation system. In some scenarios, a limited number of measurement points are practical in a large-scale steam generator system. Measured conditions are more representative when conditions in the piping (such as in solar receiver 18) are more nearly uniform. A uniform flow is beneficial in portions of piping and/or tubing exposed to solar heat. Eliminating constriction points that would otherwise create local variations in flow rate and steam quality (and thus become points for scaling or pipe deterioration) is beneficial. Uniform illumination of a piping and/or tubing system is beneficial, such as in portions of piping and/or tubing running at higher steam quality. In some situations, "hot spots" result where impurities deposit and begin pipe damage. In embodiments where multiple flow sections are connected in parallel, balanced flow and balanced illumination are beneficial across the multiple parallel sections as enabled by inlet manifold 11 connecting inlet 9 to solar receiver 18 and outlet manifold 12 connecting solar receiver 18 to outlet 10.

In some approaches, tower-type systems use vertically-oriented boiler pipes with incompletely balanced flow and uncontrollably "lumpy" illumination. In some approaches, linear Fresnel type systems use parallel flow pipes exposed to very unequal illumination, with little or no ability to measure or balance radiation across parallel pipes.

In various embodiments and/or usage scenarios, solar energy receiver 18 has a single continuous receiver pipe that is illuminated by segmented, independently controlled, parabolic mirrors, such as illustrated by collector mirrors 16 that track the sun. A single pipe, running for hundreds of feet in one direction, carries inlet water that is heated and boiled as the water proceeds through the single pipe. In some embodiments, the single pipe runs for hundreds of feet in one direction in a first run, continues in an insulated crossover section (such as crossover section 17) running perpendicular to the first run, and then continues back hundreds of feet parallel to the first run to a point perpendicular to the starting point. In some embodiments, multiple "out and back" loops (such as three parallel loops illustrated in FIG. 2) are combined in a single continuous pipe. No moving joints, hoses, or flanges interrupt flow in illuminated pipe portions (such as the portions of the continuous pipe forming solar receiver 18) or non-illuminated pipe potions (such as crossover section 17, inlet manifold 11 and outlet manifold 12 sections). In some embodiments, each of a plurality of continuous receiver pipes is formed from a single section of pipe (seamless or seamed) that is shaped, coated, and mounted in place as part of solar field construction.

In other embodiments, each of a plurality of continuous receiver pipes is formed from multiple sections of coated pipe that are welded end-to-end to form a continuous receiver. In some embodiments, pipes are welded using an orbital-welding process. In some embodiments, a continuous inside surface is achieved by welding pipe sections (solar receiver, connector and crossover) together into a single pipe. In some embodiments, multiple mirror/receiver elements are connected in series. Providing a continuous inside surface throughout receivers, connecting pipes, and/or crossover pipes, enables balanced flow of thermal medium and passing of cleaning pigs. In some embodiments, multiple mirror/receiver elements are connected in parallel (such as three parallel elements illustrated), with liquid flow balanced across the parallel elements. Each receiver element (such as illustrated by solar receiver 18) is at a respective focus point of a long series of parabolic mirror segments, such as illustrated by collector mirrors 16, delivering energy that is closely balanced across the receiver elements.

In some embodiments, a facility to clean and de-scale solar receiver pipes enables using a wide variety of standard pipe material. System designers optionally select the least expensive pipe or make economic tradeoffs including selecting pipes that require, in some usage scenarios, frequent cleaning or even replacement. Any material that meets local code (e.g. a local boiler code) requirements is acceptable, including A-106, SA-106, Gr A, Gr B, and API-5, depending on local water chemistry and other tradeoffs.

Provisions for Steam Generator Piping Maintenance

In various embodiments and/or usage scenarios, such as illustrated by FIG. 2, provisions for steam generator piping maintenance enable efficient internal cleaning. Once-through steam generators for oilfield application are enabled for internal cleaning, as deposits from water-borne impurities form over time, or rapidly if water quality is not properly maintained. Chemical cleaning (such as via acid) and mechanical cleaning (such as via passing a cleaning element, e.g. a "pig", through system piping using hydraulic pressure) are example cleaning techniques. Various embodiments of direct solar oilfield steam generation use one or more of the following techniques to enable the efficient cleaning:

Solar energy receiver piping/tubing constructed with constant inner diameter, of suitable thickness (including corrosion allowances for repeated acid cleaning) and pipe bends 15 being without bend radii that would otherwise prevent passage of cleaning pigs;

Provision in feed water and steam header systems for isolation of receiver sections and introduction 13 and recovery 14 of cleaning solutions and cleaning pigs; and Provision in a control system and feed water and steam header systems for isolation of individual collectors of a solar field, positioning reflectors of the isolated collectors "off-track" to enable cleaning operations to proceed during daylight hours while the non-isolated collectors of the solar field remain in operation.

Figure 3A:
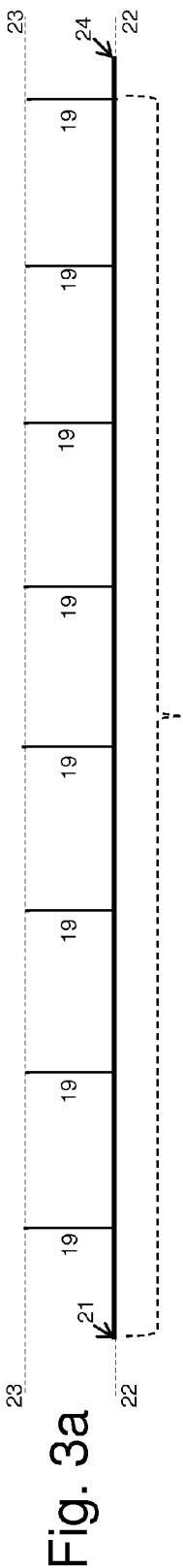
FIG. 3a illustrates, in elevation view, various details of an embodiment of suspended steam generator continuous piping in a hot (e.g. operating) condition.
Figure 3B:
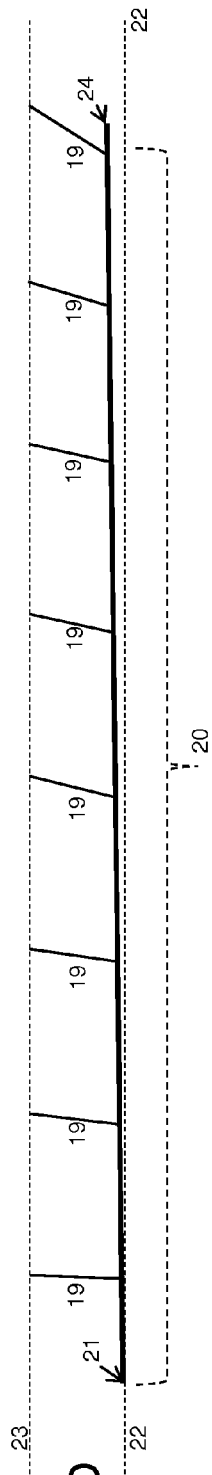
FIG. 3b illustrates, in elevation view, various details of an embodiment of suspended steam generator continuous piping in a cold (e.g. non-operating) condition.
Figure 3C:
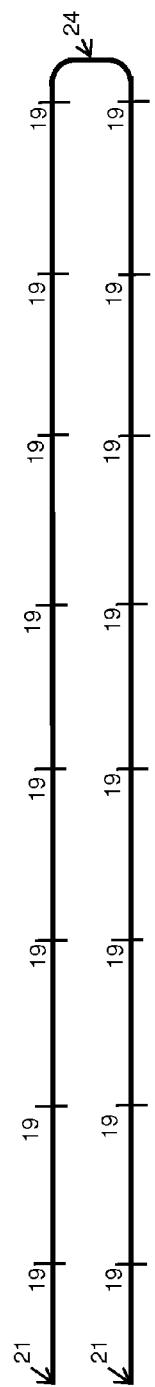
FIG. 3c illustrates, in plan view, various details of an embodiment of suspended steam generator continuous piping in a hot (e.g. operating) condition.
Figure 3D:
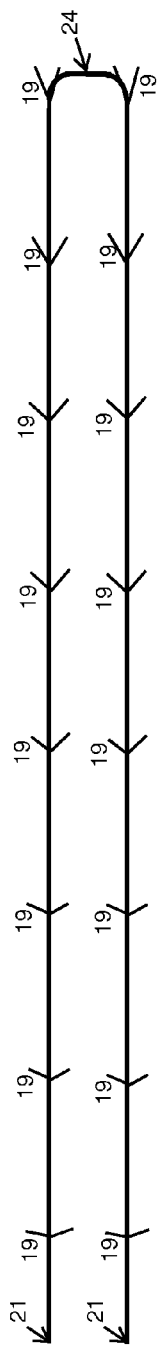
FIG. 3d illustrates, in plan view, various details of an embodiment of suspended steam generator continuous piping in a cold (e.g. non-operating) condition.

Various embodiments enable efficient accommodation, in a context of thermal expansion, of constant inner diameter, no moving joints or hoses, and wide bend radii. In some approaches, solar field designs use tight-radius "expansion loops" in a collector line to accommodate differential expansion of high-temperature a solar receiver and associated ambient-temperature support structure. Various embodiments, such as illustrated by FIGS. 3a, 3b, 3c, 3d, and 4, use a single, straight, constant-radius solar receiver line 20 (e.g. pipe or tube) that is supported by flexible members 19 extending and/or suspended from a support structure (not illustrated). Receiver line 20 is anchored laterally at fixed end 21, suspended along its length by members 19, and free to move at far end 24. At operating temperature (receiver on-sun, e.g. receiver hot) such as illustrated by FIGS. 3a and 3c, members 19 provide uniform support for receiver line 20, enabling the solar receiver to hang level (or approximately so) as illustrated by relation to construction lines 22 and 23. At ambient temperature (receiver off-sun, e.g. cold) such as illustrated by FIGS. 3b and 3d, shrinkage of solar receiver line 20 in the range of, e.g., 1%, exerts a bending moment on members 19, placing the receiver line in tension along its axis and causing far end 24 to rise as illustrated by construction lines 22 and 23 while preserving receiver line 20 as relatively straight (e.g. without substantial/significant bends). In some embodiments, such as illustrated by FIG. 4, collar 25 connects suspension members (such as members 19) to the receiver line (e.g. via permanent mounting). Using two suspension members at each collar, mounted perpendicular to the direction of the receiver line, prevents (or reduces) lateral motion of the receiver line.

Figure 5B:
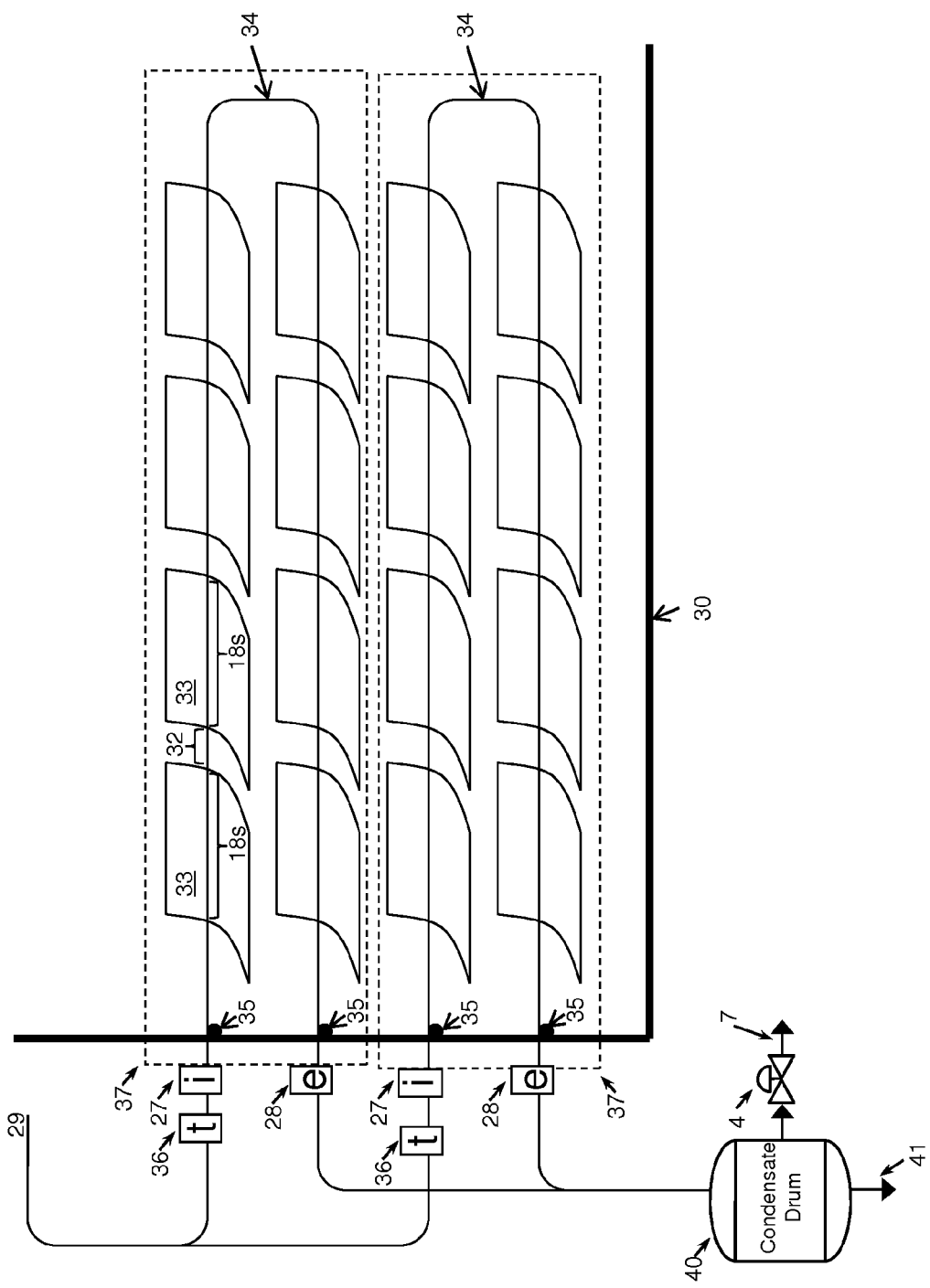
FIG. 5b illustrates, in plan view, various details of an embodiment of an evaporator portion of solar direct steam generator piping.

In various embodiments and/or usage scenarios, such as illustrated by FIGS. 5a and 5b, a solar direct steam generator is divided into a water preheat section (FIG. 5a) and an evaporator section (FIG. 5b) enclosed within protective structure 30, such as a large scale commercial greenhouse. Water preheater within construction line 31 includes an ASME Section I preheater enclosed entirely within protective structure 30. Each evaporator section 37 includes an ASME Section I evaporator enclosed entirely within protective structure 30. A system contains zero or more water preheat sections (one illustrated) and one or more evaporator sections (two illustrated). Each preheat section 31 contains one or more loops in series (two illustrated). Each evaporator section 37 contains one or more loops in series (one illustrated). Connecting pipe section 32 between independent concentrator sections 33 (the concentrator sections being suspended from solar receiver sections 18s) are continuous with solar receiver sections 18s and require no expansion joint due to suspension mechanisms such as illustrated in FIGS. 3a, 3b, 3c, 3d, and 4. Anchor points 35 are fixed to an enclosure wall of protective structure 30 and provide a fixed anchor for one end of a receiver pipe (such as receiver pipe forming solar receiver sections 18s). Receiver pipe crossover section 34 is a continuous pipe section connected to a receiver pipe (such as receiver pipe forming solar receiver sections 18s) and has a controlled radius to enable passage of cleaning pigs. Receiver pipe (such as receiver pipe forming solar receiver sections 18s and receiver pipe crossover section 34) are suspended from enclosure superstructure as illustrated in FIGS. 3a, 3b, 3c, 3d, and 4, but not connected to the enclosure wall at the crossover end and so are enabled to move when the receiver pipe expands and contracts due to changes in temperature.

Output from inlet flow control system 39 is provided via 42. Inlet valves 27 and exit valves 28 together provide isolation of the preheater and the evaporator and provide points for pig injection and extraction respectively. Trim valves 36 provide a mechanism for automatic control of fluid flow to manage solar transients. Condensate drum 40 manages output steam quality through pipe outlet 7 to an oil field or other industrial use of steam and to provide hot water through pipe outlet 41 to a feed water system or other industrial use. Connecting pipe 29 connects an output of water preheater 31 to evaporator sections 37.

Low-Temperature "Overnight" Solar Field Management

In various embodiments and/or usage scenarios, low-temperature "overnight" solar field management enables reduction or elimination of dissolved contaminant precipitation. In some instances, supply water for oilfield steam carries dissolved contaminants that precipitate as water temperature falls. In some approaches, feed water is supplied at above ambient temperature, to reduce or prevent precipitation of the dissolved contaminants. The feed water is maintained at an elevated (e.g. above ambient) temperature using, for example, backup heat sources and pumps operating through night to maintain temperature. In some approaches the backup heat sources and/or pumps consume significant amounts of heat and electrical energy. In some embodiments, backup heat sources and pumps are used in solar oilfield steam generation, continuing to circulate heated feed water through a solar field during night. The circulation is maintained at a high enough rate to overcome thermal losses and maintain all or any portions of piping at a temperature high enough to prevent dissolved contaminant (e.g. mineral) precipitation.

In some embodiments and/or usage scenarios, a "pure-impure" hybrid system maintains a reserve tank of more completely treated (with respect to higher-contaminant feed water) purified feed water. In a solar field having a feed water system with feed water inlet and outlet valves, the feed water inlet valve is closed as daily solar collection ends (e.g. at nightfall). Then purified feed water from a reserve tank is pumped into the solar field, thus displacing higher-contaminant feed water. All or most piping that will cool (e.g. during night) to ambient temperature is filled with the purified feed water, and then the feed water outlet valve is closed. Low-pressure steam and/or nitrogen blanket the reserve tank. As daily solar collection begins (e.g. at sunrise), the solar field operates in a purified water recirculating mode (with the inlet and outlet valves remaining closed) as water expands thermally. Then the inlet valve is opened to begin feeding oilfield steam feed water into the solar field, displacing and returning the purified feed water to the reserve tank. As the purified feed water is purged from the solar field, purified feed water system valves are closed and the solar field begins operating to collect solar energy, as described elsewhere herein.

Each cycle of filling and draining the solar field with the purified feed water transfers some contaminants to the purified feed water and associated components. In some embodiments, some or any portion of purified feed water components are periodically serviced and/or recharged via replacement with a fresh supply of purified water produced elsewhere. In other embodiments, a water-treatment unit operates on a recirculating basis during daytime to remove contaminants from the purified feed water, maintaining purity of the purified feed water over time. For example, an ion-exchange resin bed system maintains adequate purified feed water quality over time. For another example, a reverse-osmosis water purification system maintains adequate purified feed water quality over time.

Selected Embodiment Details

In various embodiments and/or usage scenarios, the illustrated embodiments are related to each other. For example, in some embodiments, solar heaters 8 of FIG. 1 are implemented using techniques as described by FIGS. 2, 3a-d, 4, and 5a-b. For another example, in some embodiments, solar receiver line 20, of FIGS. 3a-b, is representative of solar receiver 18 of FIG. 2.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible, consistent with the description, and are within the scope of the claims of the issued patent. The names given to elements are merely exemplary, and should not be construed as limiting the concepts described. Also, unless specifically stated to the contrary, value ranges specified, maximum and minimum values used, or other particular specifications, are merely those of the described embodiments, are expected to track improvements and changes in implementation technology, and should not be construed as limitations.

Functionally equivalent techniques known in the art are employable instead of those described to implement various components, sub-systems, operations, functions, or portions thereof.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other applications, and are not limited to the particular application or industry of the described embodiments. The invention is thus to be construed as including all possible modifications and variations encompassed within the scope of the claims of the issued patent.

What is claimed is:

1. A solar collection system comprising:
   an inlet manifold coupled to a source of water;
   an outlet manifold;
   a solar heater having:
      a plurality of solar energy receiver pipes coupled between the inlet manifold and the outlet manifold; and
      a plurality of solar energy mirrors positioned to track the sun and illuminate portions of the solar energy receiver pipes with solar energy reflected from the solar energy mirrors;
   a steam distribution system coupled between the outlet manifold and an oilfield steam injection well to direct steam from the water into the well, without a reboiler between the outlet manifold and the injection well; and
   a controller operatively coupled to at least one of the inlet manifold, the outlet manifold and the receiver pipes, the controller being configured to (a) isolate a particular receiver pipe from other receiver pipes, and (b) position a reflector corresponding to the particular receiver pipe off-sun, during cleaning operations.

2. A solar collection system comprising:
   an inlet manifold coupled to a source of water;
   an outlet manifold;
   a solar heater having:
      a plurality of solar energy receiver pipes coupled between the inlet manifold and the outlet manifold; and
      a plurality of solar energy mirrors positioned to track the sun and illuminate portions of the solar energy receiver pipes with solar energy reflected from the solar energy mirrors onto the portions of the solar energy receiver pipes;
      wherein the portions of the solar energy receiver pipes are constructed of a thickness enabling repeated acid cleaning;
   a steam distribution system coupled between the outlet manifold and an oilfield steam injection well to direct steam from the water into the well, without a reboiler between the outlet manifold and the injection well; and
   a controller operatively coupled to the inlet manifold, the outlet manifold and the receiver pipes, the controller being configured to (a) isolate a particular receiver pipe from other receiver pipes, and (b) position a reflector corresponding to the particular receiver pipe off-sun, during cleaning operations.

3. The system of claim 2 wherein at least one of the solar enemy receiver pipes includes a cleaning pig injection location and a cleaning pig extraction location enabled to inject and/or extract one or more of the cleaning pigs.

4. The system of claim 3, wherein the solar energy receiver pipes are connected with connecting pipes and crossover pipes having a thickness equal to the thickness of the solar energy receiver pipes.

5. The system of claim 4, wherein the solar energy receiver pipes and the solar energy mirrors are within an at least partially enclosing and at least partially transparent structure.

6. The system of claim 4, wherein the solar energy receiver pipes have a continuous inside surface from a cleaning pig an injection location to the cleaning pig extraction location.

7. The system of claim 6, wherein the solar energy receiver pipes have a constant nominal inner diameter.

* * * * *